United States Patent [19]

Yamaguchi et al.

[11] Patent Number: 5,133,608
[45] Date of Patent: Jul. 28, 1992

[54] LINEAR MOVEMENT ROLLING GUIDE APPARATUS AND METHOD OF MANUFACTURING BEARING ROLLER

[75] Inventors: Toshiaki Yamaguchi; Nobuhide Hayashi, both of Maebashi, Japan

[73] Assignee: Nippon Seiko Kabushiki Kaisha, Tokyo, Japan

[21] Appl. No.: 650,480

[22] Filed: Feb. 5, 1991

[30] Foreign Application Priority Data

Feb. 7, 1990 [JP] Japan .................................. 2-28028
Apr. 11, 1990 [JP] Japan .................................. 2-95575

[51] Int. Cl.⁵ ............................................. F16C 29/04
[52] U.S. Cl. .......................................... 384/50; 384/47
[58] Field of Search ................. 384/50, 565, 450, 13, 384/47, 625

[56] References Cited

U.S. PATENT DOCUMENTS 4,973,068 11/1990 Lebeck ................................ 384/625

Primary Examiner—Lenard A. Footland
Attorney, Agent, or Firm—Basile and Hanlon

[57] ABSTRACT

A roller for a bearing used in a linear movement rolling guide apparatus is tumbled after superfinishing the outer peripheral surface so that the surface roughness of the roller in a circumferential direction is in a range from 0.05 to 0.10 micrometers in average roughness on the center line. The surface roughness in the circumferential direction of the outer peripheral surface of the roller is substantially equal to or slightly larger than the surface roughness in the axial direction of the outer peripheral surface to thereby prevent the occurrence of microslip.

4 Claims, 2 Drawing Sheets

LINEAR MOVEMENT ROLLING GUIDE APPARATUS AND METHOD OF MANUFACTURING BEARING ROLLER

BACKGROUND OF THE INVENTION

1. Field of the Invention

The present invention relates to a liner movement rolling guide apparatus of a feed table apparatus for movably supporting a movable table with respect to a bed, and to a method for manufacturing a rolling bearing roller.

2. Description of the Art

A fundamental structure of a linear movement rolling bearing includes, as shown in FIGS. 3 and 4, a guide rail 1 fixed to a base 2 and another guide rail 3 fixed to a movable table 4. A multiplicity of rollers 5 retained in a retainer 6 are interposed between the guide rail 1 and the guide rail 3. In this respect, the rollers 5 are of the cross roller type in which axis lines of adjacent rollers intersect with each other at an angle of 90 degrees. However, there also is a linear roller type in which the axis lines of the rollers 5 are in parallel with one another. The fundamental structure of this linear movement rolling bearing is shown in U.S. Pat. No. 3,778,121.

However, in the prior art linear movement rolling bearing 7, the rollers 5 are not constrained between the guide rails 1 and 3 in the longitudinal direction. As a result, relative positions between the guide rails 1 and 3 and the retainer 6 are deviated little by little and, ultimately, the retainer 6 will slip from the guide rails 1 and 3. This phenomenon is called a micro-slip phenomenon. In order to prevent the micro-slip phenomenon, it has been well known to form rack teeth in the guide rails 1 and 3 and, also, pinion-like teeth in an outer peripheral surface of the rollers 5 to thereby make associated members engage each other. Alternately, the movements of these members are corrected by a wire or the like. However, a problem is involved in these measures in that the structure becomes complicated and the manufacturing costs are increased. In addition, each of the associated members is excessively constrained.

The inventors of the present application conducted various experiments and analyses to clarify the cause of the micro-slip phenomenon and found that the cause of the micro-slip phenomenon resides in a slip between the rollers and both of the guide rails with which the rollers are in contact while rolling. Based on this knowledge, bearing rollers were invented which solve the above-mentioned problems by specifying a relationship between surface roughness in a circumferential direction and surface roughness in an axial direction of an outer peripheral surface of the rollers to suppress the slip of the rollers with respect to both of the guide rails.

Furthermore, when a conventional surface treatment is applied to the roller in order to manufacture a roller which has a specific relationship between the surface roughness in the circumferential direction and the surface roughness in the axial direction of the outer peripheral surface, the following problem was revealed. That is, in a grinding finishing of an outer peripheral surface of a roller material which is performed while rotating the roller material, when the surface roughness in the circumferential direction is increased, the surface roughness in the axial direction becomes further increased as compared with that in the circumferential direction. As a result, a problem arose in the operability and the durability of the bearing roller. Moreover, when the roller material which has been ground is further subjected to tumbling, the roughness of the peripheral surface formed during the grinding work and the low dimensional accuracy are adversely effected, and a desired surface condition cannot be stably achieved.

SUMMARY OF THE INVENTION

It is an object of the present invention to provide a bearing roller which prevents a resulting complicated structure and an increase in manufacturing costs without requiring particular, additional members and, further, which prevents micro-slip without requiring excessive modification to the structure.

It is another object of the present invention to provide a method of stably manufacturing the bearing roller mentioned above.

A linear movement rolling bearing guide apparatus of the present invention includes a pair of parallel guide rails relatively moveable in an axial direction and rollers which roll between the pair of guide rails. In the linear movement rolling bearing guide apparatus, the improvement in which surface roughness in a circumferential direction of an outer peripheral surface of the rollers is made substantially equal to the surface roughness in an axial direction of the outer peripheral surface of the rollers, or the surface roughness in the circumferential direction is made slightly larger than the surface roughness in the axial direction.

In particular, it is preferable to select the surface roughness in the circumferential direction of the outer peripheral surface in a range from 0.05 to 0.10 micrometers in average roughness on the center line.

In a method of manufacturing the bearing roller, after performing a grinding work on the peripheral surface of a roller material, the peripheral surface is superfinished to smooth the peripheral surface in the axial direction and in the circumferential direction. Following this, the smooth peripheral surface is tumbled to thereby make the surface roughness in the circumferential direction substantially equal to the surface roughness in the axial direction, or to make the surface roughness in the circumferential direction slightly larger than the surface roughness in the axial direction.

DESCRIPTION OF THE PREFERRED EMBODIMENTS

When a bearing roller is used for the linear movement rolling guide apparatus mentioned above, during movement of the rollers and the retainer which is held between the guide rails, the external load and preload become non-uniform due to gravity and inertia and the like, and a difference in resistance is generated due to such non-uniformity which results in occurrence of a micro-slip. However, since the guide rails and the rollers are in contact with each other, a frictional force therebetween to suppress the micro-slip is also acting between the guide rails and the rollers. This suppressing force is shown schematically in FIG. 1 in which, for the sake of facilitating the explanation, the roller 5 is shown in the form of a pinion, and similarly, the guide rails 1 and 3 are shown in the form of racks.

Figure 1:
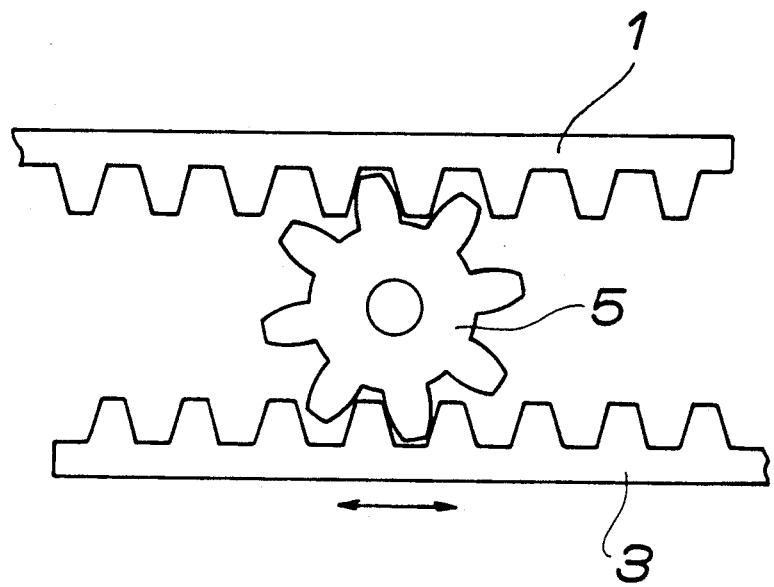
FIG. 1 is a schematic diagram for explaining the suppressing force of the micro-slip.

The micro-slip inherently occurs when the amount of relative movement between the roller 5 and the guide rails 1 and 3 during a forward movement differs from that during a backward movement in an overall reciprocating movement. Such a phenomenon can be prevented if the roller 5 performs only a predetermined rolling movement and no slip is generated between the roller 5 and the guide rails 1 and 3. Accordingly, as shown in FIG. 1, when the contact portions of the roller 5 and the guide rails 1 and 3 are engaged with each other, no relative slip will be generated. Thus, if a slip frictional force at the contact portions is increased, the frictional force will act as a suppressing force of the micro-slip.

However, in order to function as a bearing in the liner movement rolling guide apparatus and the like, it is necessary to increase the frictional force between the roller 5 and the guide rails 1 and 3 and, also, a load in a radial direction of the roller 5 must be supported by the guide rails 1 and 3. Furthermore, the smoothness of the rolling guide must be insured. As a result, the teeth of the roller 5 and the guide rails 1 and 3 can not be engaged with each other as shown in FIG. 1.

For this reason, if the surface roughness in the circumferential direction of the outer peripheral surface of the roller is made equal to or slightly larger than the surface roughness in the axial direction of the outer peripheral surface, the frictional force of the roller during rolling is increased and the micro-slip can be prevented. At the same, time, the support of the radial load and the smoothness of the rolling guide are insured.

Accordingly, as a first working of the roller material, a grinding work is performed on the outer peripheral surface of the roller material. Subsequently, as a second working, a superfinishing is performed on the outer peripheral surface of the roller material so that the outer peripheral surface is smoothed in the axial direction and in the circumferential direction to thereby insure the accuracy of the roller and to achieve an intermediate finishing. In addition a required surface roughness is attained and finished by tumbling the above-mentioned smooth surface of the roller material. By such tumbling, in principle, the surface roughness in the circumferential direction and in the axial direction of the outer peripheral surface of the roller becomes substantially the same. However, since the outer peripheral surface of the roller is linear in the axial direction whereas it is in a circular arc shape in the circumferential direction, in becomes slightly larger than that in the axial direction.

Furthermore, by making the surface roughness in the circumferential direction fall in a range from 0.05 to 0.10 micrometers in average roughness on the center line, the slip frictional force at the contact points between the roller and the guide rails can be made as large as required and, at the same time, the straightness of the rolling guide apparatus can be insured.

Figure 3:
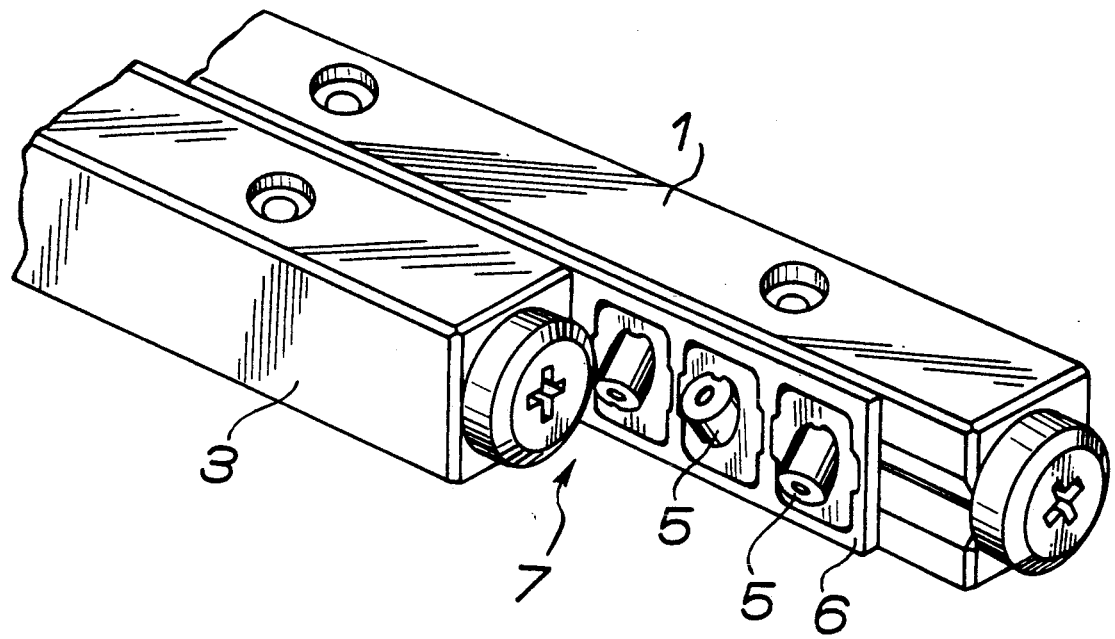
FIG. 3 is a perspective view showing a relationship between the roller and the guide rails.
Figure 4:
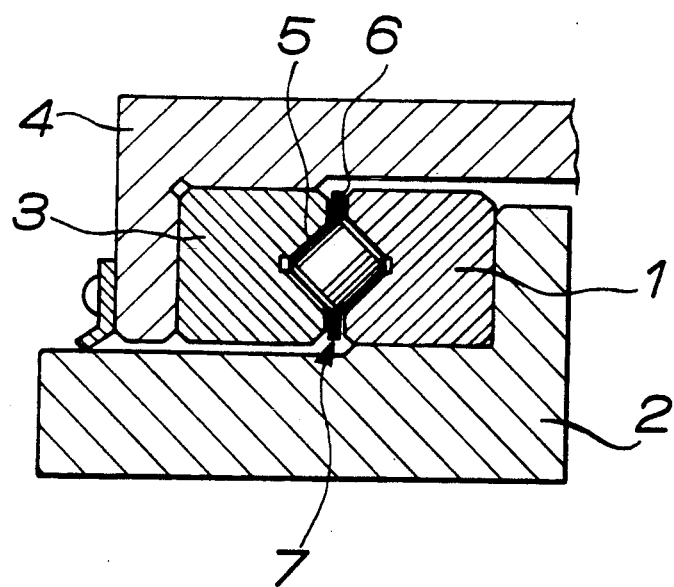
FIG. 4 is a cross sectional view of a linear movement rolling guide apparatus.

In FIG. 3, a roller 5 of a linear movement rolling bearing 7 is used in prior art linear movement rolling guide apparatus of the cross roller type or the linear roller type described in the foregoing. The roller 5 has been subjected to a first working, a second working, and finishing which will be described in detail hereafter.

Figure 2:
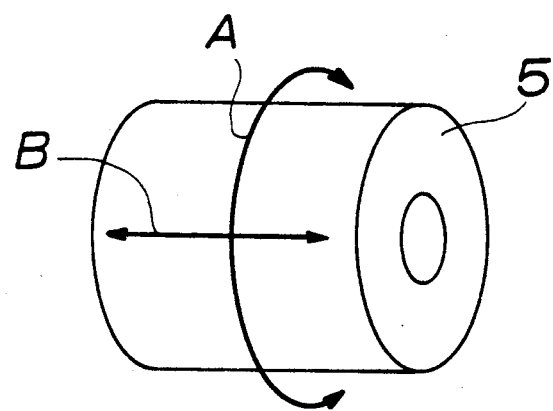
FIG. 2 is a perspective view of a roller in accordance with the present invention.

In the first working, a grinding work is performed on an outer peripheral surface of a roller material and, as a result of this first working, the surface roughness in an axial direction (in the direction of arrow B in FIG. 2) of the outer peripheral surface becomes larger than the surface roughness in a circumferential direction (in the direction of arrow A in FIG. 2) due to the working direction. Specifically, the grinding work is performed by inserting the roller material held by a work rest from a below position into a space between a grinding whetstone wheel and an adjusting whetstone wheel which feeds the roller material. That is, the grinding work is performed by a through-feed method in which the roller material is fed by the adjusting whetstone wheel. By this grinding work, the average roughness on a centerline in the circumferential direction of the outer peripheral surface of the roller material becomes about ⅓ of the average roughness on a centerline in the axial direction.

Subsequently, as the second working, a superfinishing is performed on the outer peripheral surface of the roller material after the above-mentioned grinding work. In this superfinishing, the roller material is inserted and held between two adjusting rolls and is ground by a superfinishing whetstone having a concave surface of the same circular arc shape as the outer peripheral surface of the roller material and having a width not smaller than a width of the roller material. By this superfinishing, both the axial direction and the circumferential direction of the outer surface are made smooth, and the dimensional accuracy as a roller is insured. This working constitutes an intermediate finishing and, in this step, since the outer peripheral surface is finished to form a mirror surface, no preventive force of the micro-slip is present.

Furthermore, after the superfinishing mentioned above, the smooth outer peripheral surface of the roller material is subjected to tumbling which constitutes a final finishing. Due to this final finishing, the average roughness on the center line is made to about 0.07 micrometers and uniform in the circumferential direction and in the axial direction of the outer peripheral surface. As a result, the roller 5 is formed. In addition, the rolling friction of the roller 5 is small and its slip friction is large.

In contrast, in the prior art roller, the average roughness on the center line in the axial direction of the roller surface is about 0.06 micrometers, and the average roughness on the center line in the circumferential direction is about ⅓ or 0.02 micrometers. In other words, in the prior art working method of the roller surface, even when the grinding work and the additional superfinishing are performed, the surface roughness in the circumferential direction is at most ⅓ of the surface roughness in the axial direction.

As described in the foregoing, the suppressing force of the micro-slip is associated with the slip frictional force in the circumferential direction of the surface of the roller 5. However, in the roller which is ground in the conventional manner, or the roller which is superfinished in the conventional manner, the average roughness on the center line in the circumferential direction is extremely small and, thus, the slip frictional force is small. Accordingly, the function of suppressing the micro-slip in the roller 5 in this embodiment is far superior to that in the prior art roller.

In this respect, the surface roughness in the axial direction seldom affects the suppressing force of the micro-slip. On the other hand, when the surface roughness in the axial direction is increased, the contact of the roller 5 with the guide rails 1 and 3 becomes non-uniform and a non-uniform preload or skew is apt to be generated which is also a cause of the occurrence of the micro-slip. As a result, a problem will arise if the surface roughness in the axial direction is significantly increased. In view of these conditions, it is preferable that the roughness of the surface of the roller 5 be within a range which is capable of suppressing the micro-slip, and the roughness in the axial direction does not differ to a great extent from that in the circumferential direction.

When the surface roughness is made excessively large in either the axial direction or in the circumferential direction, although the suppressing force of the micro-slip in increased, the contact of the roller 5 with the guide rails 1 and 3 becomes non-uniform as described above and the occurrence of the micro-slip is rather promoted. Further, properties such as the straightness of the reciprocating raceways and its durability are degraded. These conditions are not adequate for a linear movement rolling guide apparatus.

The inventors of the present application, based on experiments and study, selected the surface roughness in the circumferential direction of the outer peripheral surface of the roller to be in the range from 0.05 to 0.10 micrometers in average roughness on the center line as described above and, on the other hand, the surface roughness in the circumferential direction is made substantially equal to or slightly larger than the surface roughness in the axial direction of the outer peripheral surface. By this measure, the inventors were successful in completely suppressing the micro-slip in a normal working range without degrading properties, such as the straightness and the durability of the reciprocating raceways.

In this respect, in the linear movement roller guide apparatus using the prior art rollers, the micro-slip occurred at the rate of 70%. On the other hand, in the case which the roller 5 of this invention is used, the micro-slip did not occur entirely, and, even when the value of the surface roughness is slightly smaller or larger than the above-mentioned value, the micro-slip did not occur if the surface roughness in the circumferential direction is in the range from 0.05 to 0.10 micrometers in average roughness on the center line.

As described in the foregoing, in the bearing roller in the present invention, the occurrence of the micro-slip can be suppressed by specifying the surface roughness of the roller without adding any particular structural members to the guide apparatus.

In particular, when the surface roughness in the circumferential direction of the outer peripheral surface is selected in a range from 0.05 to 0.10 micrometers in average roughness on the center line, the effect of suppressing the micro-slip is high.

Furthermore, in the method of manufacturing the bearing roller in the present invention, it is possible to obtain a bearing roller which effectively prevents the occurrence of the micro-slip without causing variations in the quality of the outer peripheral surface of the roller by sequentially performing a grinding work, a superfinishing work and a tumbling on the roller material.

Moreover, in this roller, since the tumbling work is performed on the roller material after a work-affected layer created by the grinding has been removed by the superfinishing and after a uniform surface has been achieved with high accuracy, the durability of the roller is excellent. Further, since the surface roughness is selected in a predetermined range of values to prevent the micro-slip, there is no need to add any particular mechanism for preventing the occurrence of the micro-slip.

What is claimed is:

1. In a linear movement rolling guide apparatus including a pair of parallel guide rails relatively movable in an axial direction, rollers rollably disposed between the pair of guide rails, and a retainer disposed between the parallel guide rails to hold the rollers at respective positions while movement of the retainer in a longitudinal direction relative to the guide rails is uncontrolled, the improvement comprising:
    the surface roughness in a circumferential direction of an outer peripheral surface of each o the rollers being substantially equal to or slightly larger than the surface roughness in an axial direction of the outer peripheral surface to thereby prevent a micro-slip in which a relative position of the retainer is gradually deviated with respect to the parallel guide rails due to a reciprocating movement of the parallel guide rails.

2. The improvement in a linear movement rolling guide apparatus according to claim 1 wherein he surface roughness in the circumferential direction of the outer peripheral surface is selected in a range from 0.05 to 0.10 micrometers in center-line means roughness.

3. The improvement in a linear movement rolling guide apparatus according to claim 1 wherein the surface roughness of each roller is obtained by the process comprising the steps of:
    tumbling each roller after the outer peripheral surface of each roller has been super-finished to smooth the outer surface in both an axial direction and in a circumferential direction.

4. The improvement in a linear movement rolling guide apparatus according to claim 1 wherein:
    each roller has a tumbled surface roughness after the outer peripheral surface of each roller has been super-finished to smooth the outer surface in both an axial direction and in a circumferential direction.

* * * * *